United States Patent [19]

Hoshino et al.

[11] Patent Number: 5,148,416
[45] Date of Patent: Sep. 15, 1992

[54] SIGNAL PROCESSING CIRCUIT FOR MAGNETOOPTICAL RECORD/REPRODUCING APPARATUS

[75] Inventors: Shunji Hoshino, Yokohama; Hiroya Ohkuma, Tokyo, both of Japan

[73] Assignee: Nikon Corporation, Tokyo, Japan

[21] Appl. No.: 530,749

[22] Filed: May 30, 1990

[30] Foreign Application Priority Data

Jun. 5, 1989 [JP] Japan .................. 1-142376
Oct. 14, 1989 [JP] Japan .................. 1-267509

[51] Int. Cl.$^5$ .................................................. G11B 7/00
[52] U.S. Cl. .................... 369/32; 369/44.37; 369/121
[58] Field of Search .............. 369/32, 48, 13, 49, 369/121, 128, 44.37; 360/114

[56] References Cited

U.S. PATENT DOCUMENTS

| | | | |
|---|---|---|---|
| 4,642,703 | 2/1987 | Endo | 360/114 |
| 4,733,385 | 3/1988 | Henmi et al. | 369/13 |
| 4,807,204 | 2/1989 | Mizutani et al. | 360/114 |
| 4,845,696 | 7/1989 | Ohtsuki et al. | 369/13 |
| 4,888,750 | 12/1989 | Kryder et al. | 369/13 |
| 4,932,014 | 6/1990 | Tamiya | 369/48 |
| 4,977,550 | 12/1990 | Furuya et al. | 369/32 |
| 4,979,158 | 12/1990 | Yoda | 360/114 |

FOREIGN PATENT DOCUMENTS

0316188 5/1989 European Pat. Off. .

Primary Examiner—Roy N. Envall, Jr.
Assistant Examiner—Nabil Hindi
Attorney, Agent, or Firm—Shapiro and Shapiro

[57] ABSTRACT

Optical recording/reproducing apparatus of the 2-head or 3-head type uses a simplified controller but is nevertheless capable of high-speed read-after-write check. In a 2-head embodiment a switching circuit supplies either a reproducing output of a recording head or a reproducing output of a reproducing head to a signal processing circuit selectively. When the reproducing output of the reproducing head is supplied, a signal generator supplies a signal to the signal processing circuit corresponding to the reproducing output of the recording head. In a 3-head embodiment a circuit compares identification signals in reproducing outputs of an erasing head and a recording head, respectively, and supplies the recording head with data to be recorded from a FIFO memory. A 3-head embodiment may also use a switching circuit for supplying either a reproducing output of an erasing head or a reproducing output of a reproducing head to a signal processing circuit.

7 Claims, 5 Drawing Sheets

SIGNAL PROCESSING CIRCUIT FOR MAGNETOOPTICAL RECORD/REPRODUCING APPARATUS

BACKGROUND OF THE INVENTION

1 Field of the Invention

The present invention relates to a signal processing circuit for a record/reproducing apparatus employing an optical recording medium (including magneto optical recording medium), and more particularly to a signal processing circuit adapted for use in an add-on optical record/reproducing apparatus, an overwritable magnetooptical record/reproducing apparatus or an overwritable phase-change optical record/reproducing apparatus (hereinafter collectively called 2-beam optical record/reproducing apparatus), or an erasable magnetooptical record/reproducing apparatus or an erasable phase-change optical record/reproducing apparatus (hereinafter collectively called 3-beam optical record/reproducing apparatus).

2. Related Background Art

In a magnetooptical record/reproducing apparatus for information recording and replay with a magnetooptical recording medium such as a magnetooptical disk or card, the information recording is usually accomplished by three modes, namely erasure (E), recording or writing (W), and replay or reading (R).

For example, as shown in FIG. 6, in order to effect these three modes of erasure, writing and reading on a magnetooptical disk at a high speed, a controller 6, for controlling the functions of the magnetooptical disk record/reproducing apparatus under the commands of a host computer 7 has conventionally been equipped with an erasure (E) signal process circuit 62, a write (W) signal process circuit 63 and a read (R) signal process circuit 64, respectively corresponding to signals of an erasure head 2, a write head 3 and a read head 4.

FIG. 6 shows a conventional example of signal processing in a 3-beam magnetooptical disk drive, of which functions will be explained in the following.

At first an old signal already recorded on a magnetooptical disk (hereinafter simply called disk) 1 is read by the erasure (E) head 2, and the signal 2a from the erasure head is binary digitized by a replay process circuit 22 for the erasure head. The digitized signal is supplied, as the read data 22a, through an interface 5 to an erasure signal process circuit 62 in the controller 6. For erasing the old signal, the process circuit 62 releases an erasure gate signal 22b through the interface 5. An erasure laser drive unit 21 generates an erasure signal 21a in synchronization with erasure gate signal 22b, thereby erasing the signal recorded on the disk 1 by the erasure head 2.

Then, for recording a new signal in the erased portion, a signal 33a read by the write head 3 is binary digitized by a replay process circuit 32 of the write head, and supplied, as the read data 32a of the write head, through the interface 5 to a write signal process circuit 63 of the controller 6. In response, process circuit 63 releases, through the interface 5, a write gate signal 20a and write data 30a. A write laser drive unit 31 generates a recording signal 31a, in synchronization with the write gate signal 20a, thereby writing a new signal in the erased portion of the disk 1.

Then, in response to a read gate signal 40a supplied from a read signal process circuit 64 of the controller 6 through the interface 5, a reading laser drive unit 41 activates a reading head 4, thereby reading the new signal 4a written on the disk 1. The signal 4a is binary digitized by a replay process circuit 42 for reading, and supplied, as the read data 42a of the reading head, through the interface 5 to the controller 6 receiving commands from the host computer 7.

In order to accomplish erasure, recording and reproduction at a high speed, namely without waiting time for disk rotation, there has been required the controller 6 of a complex structure as explained above.

In the foregoing there has been explained a case of utilizing a disk as the recording medium, but the situation is the same when a card is employed as the recording medium.

As explained in the foregoing, in the case of writing a new signal in an already recorded area with a conventional magnetooptical record/reproducing apparatus, it is necessary to erase the already recorded signal with the erasing beam and to write the new signal by the writing beam, and the controller is inevitably complex as three signal processing circuits for erasure, writing and reading are required in the controller.

Also in an optical record/reproducing apparatus employing an optical recording medium such as a disk-shaped or card-shaped medium, there is often required a read-after-write (RAW) check in which the newly recorded signal is immediately replayed for confirming correct recording. This check is accomplished by writing a new signal with a recording beam, and replaying the new signal recorded on the optical recording medium with a reproducing beam, and these operations are controlled by the controller and the host computer.

In order to accomplish the signal processing for such RAW check at a high speed, the signal processing for recording and replay has to be conducted without waiting time for rotation in case of a disk-shaped medium, or without waiting time for re-scanning in case of a card-shaped medium, and the signals reproduced from the beams are sent to the controller for signal processing.

In the following there will be explained, with reference to FIG. 6, the operations of RAW check in a conventional disk-shaped optical recording medium (hereinafter called optical disk). The high-speed recording and replay to or from the optical disk have conventionally been conducted by the commands from the host computer 7. The controller 6, for controlling the functions of the optical disk record/reproducing apparatus according to such commands is provided with a recording signal process circuit 63 and a replaying signal process circuit 64, respectively corresponding to the signal from the recording head 3 and the signal from the reproducing head 4.

For recording a new signal in an area of the optical disk 1, signal replaying is conducted at first by the recording head 3, in order to detect an area available for signal writing. The signal 33a read by a recording optical unit 33 of the recording head 3 is binary digitized by a replay process circuit 32 for recording, and is supplied, as the reproduced data 32a of the recording beam, through the interface 5 to the recording signal process circuit 63 of the controller 6. After confirmation that the area is available for signal writing, the controller 6 sends a recording command to the recording signal process circuit 63, which, in response, sends a recording gate signal 20a and recording data 30a through the interface 5 to the recording head 3. A recording laser drive unit 31 of the recording head 3 releases a recording signal 31a in synchronization with the recording gate signal 20a, thereby causing the recording optical unit 33 to write the signal onto the optical disk 1.

Then, in response to a command from the host computer 7, the reproducing signal process circuit 64 of the controller 6 activates the reproducing head 4 through the interface 5, thereby reading the signal recorded on the optical disk 1. In the reproducing head 4, the replay signal 43a from the reproducing optical unit 43 is binary digitized by the replay process circuit 42, and supplied, as a replay signal of the reproducing beam, through the interface 5 to the controller 6.

The RAW check is accomplished in this manner.

In such conventional optical record/reproducing apparatus, the RAW check has been conducted by recording a signal with the recording head 3, replaying the new signal, recorded on the optical disk 1, with the reproducing head 4, and checking the reproduced data 42a of the reproducing beam by the controller 6.

In order to achieve RAW check at high speed, or, without waiting time for disk rotation, there are required the reproduced data 32a of the recording beam and the reproduced data 42a of the reproducing beam. Consequently the 2-beam optical record/reproducing apparatus requires two signal process circuits 63, 64, and the 3-beam apparatus requires three signal process circuits. Also the speed of the operations is still limited by the judgement of the controller 6.

SUMMARY OF THE INVENTION

An object of the present invention is to provide a signal processing circuit provided with a simplified controller.

Another object of the present invention is to provide a signal processing circuit, adapted for use in an optical record/reproducing apparatus, capable of high-speed RAW check with a simple structure.

Still another object of the present invention is to provide a signal processing circuit, adapted for use in a 2-beam or 3-beam optical record/reproducing apparatus, capable of high-speed RAW check with a simple structure.

Figure 1:
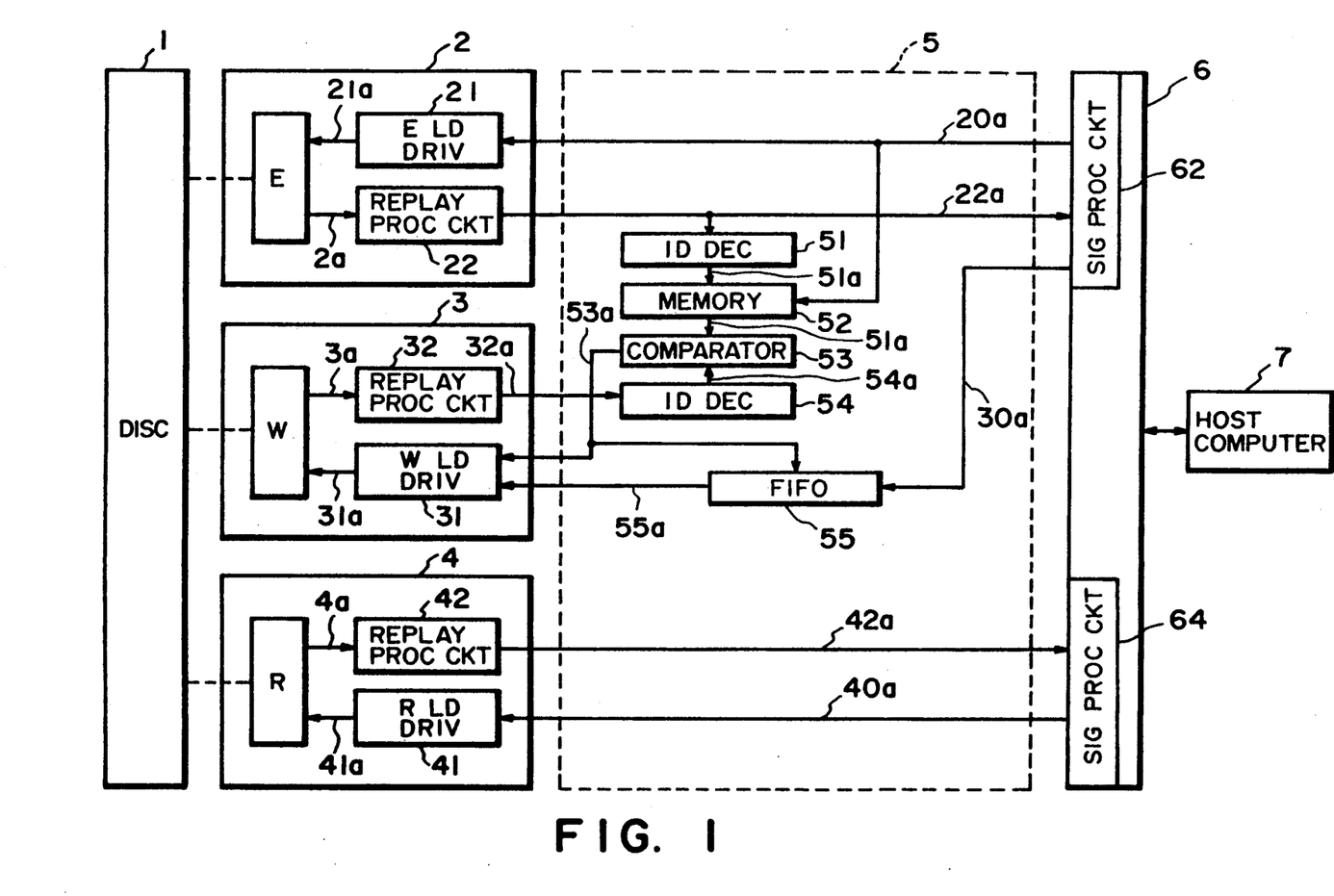
FIG. 1 is a block diagram showing signal processing in a magnetooptical disk drive embodying the present invention.

As shown in FIG. 1 the foregoing objects can be attained, according to the present invention, by a magneto optical record/reproducing apparatus, in which an in their movement relative to the same track of a disk 1, that a point of the disk 1 is at first passed by the erasing head 2 and then by the writing head 3, comprising a memory 52 for storing the ID number 51a of the start point of erasure, a first-in-first-out (FIFO) register 55 for storing the data to be recorded on the disk 1 and releasing the data in the order of storage, and a comparator circuit 53 for comparing a second ID number 54a reproduced by the writing head 3 with the ID number 51a stored in memory, wherein, in response to a signal indicating the coincidence of the ID numbers from comparator circuit 53, the data stored in FIFO register 55 are supplied to the writing head 3 for recording on the disk 1.

In a 3-beam magnetooptical record/reproducing apparatus, there is delay of a certain time between the erasure and writing. The present inventors have discovered that the erasing signal process circuit 62 and the writing signal process circuit 63 (FIG. 6) of the controller 6 can be united.

In the interface 5 of the present invention, the erasing head 2 is taken as reference for the writing operation.

Consequently, in contrast to the conventional controller 6 requiring the erasing signal process circuit 62 and the writing signal process circuit 63, there is required only one erasing signal process circuit 62 in the present invention.

Figure 3:
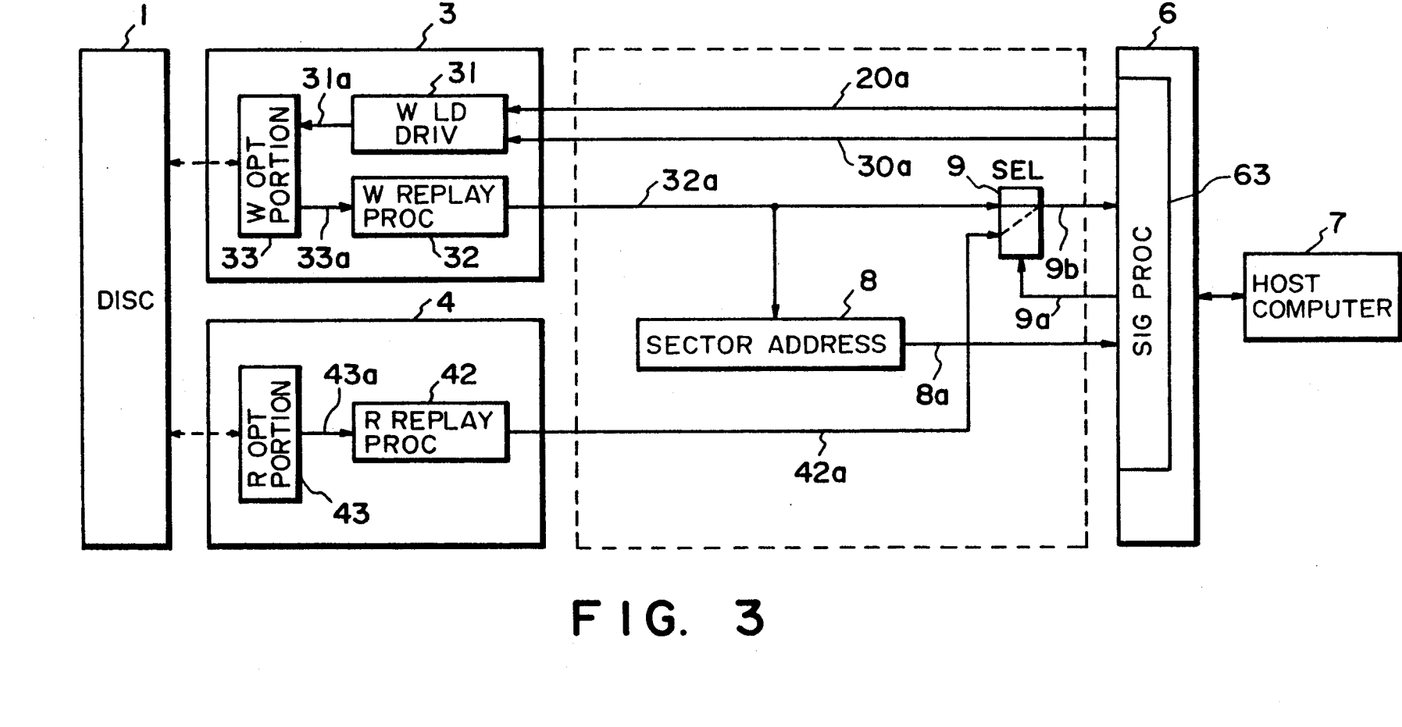
FIG. 3 is a signal processing circuit of a 2-beam optical record/reproducing apparatus of the present invention.

Also, as shown in FIG. 3 the present invention provides a signal circuit for use in a 2-beam optical record/reproducing apparatus, comprising a head selector 9 for selecting reproduced data 32a of a recording beam or reproduced data 42a of a reproducing beam in the course of movement of the beams on the same track of an optical disk 1, and a sector address mark detection circuit 8 for generating a signal replacing the reproduced data 32a of the recording beam when the reproduced data 42a of the reproducing beam are selected, thereby enabling the RAW check.

Figure 4:
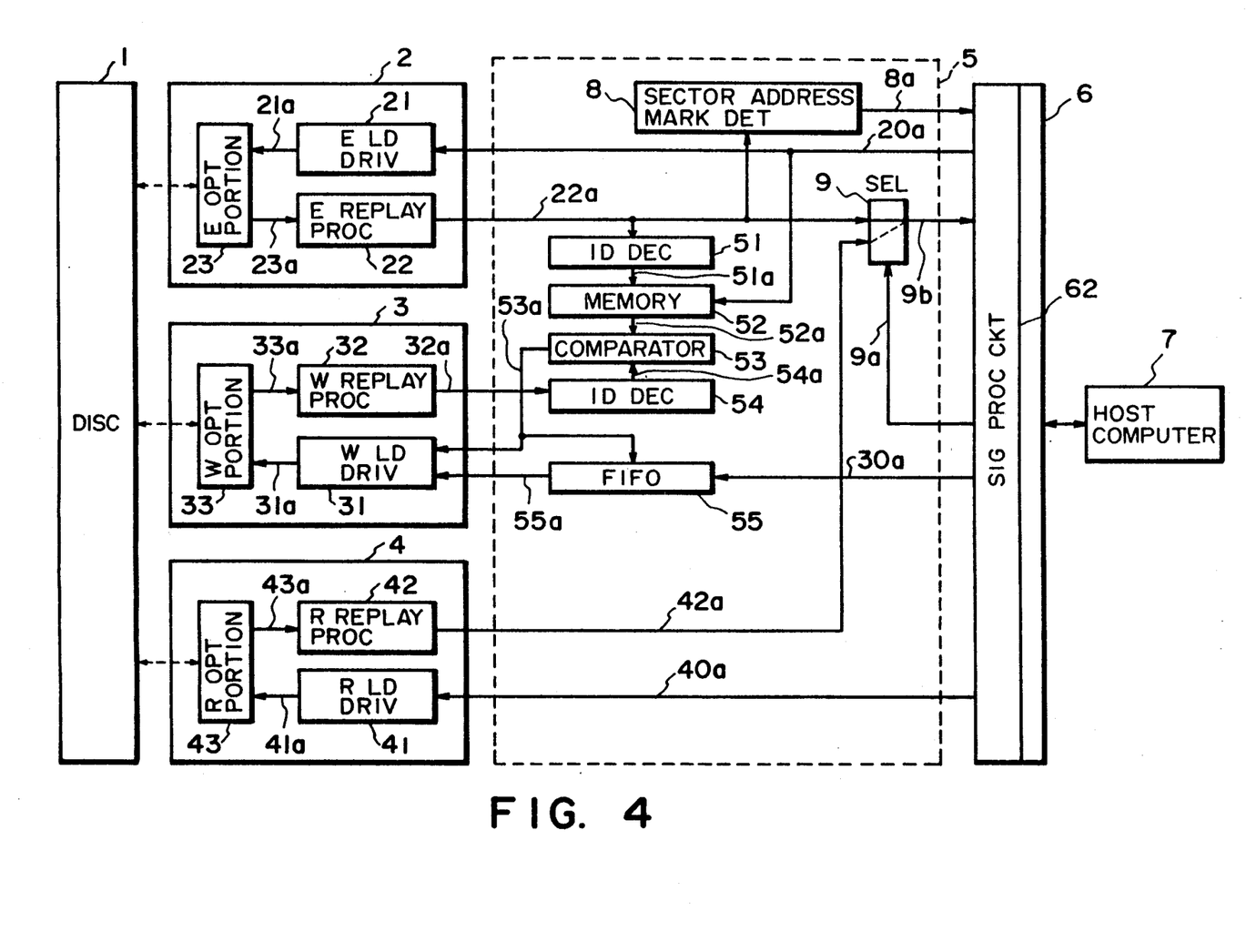
FIG. 4 is a signal processing circuit of a 3-beam optical record/reproducing apparatus of the present invention.

Also, as shown in FIG. 4, the present invention provides a signal processing circuit for use in a 3-beam optical record/reproducing apparatus, in which an erasing beam, a recording beam and a reproducing beam are so positioned, in their movement relative to the same track on an optical disk 1, that a point of the disk 1 is passed at first by the erasing beam, then by the recording beam and at last by the reproducing beam, comprising a memory 52 for storing the ID number of the start point of erasure, a FIFO memory 55 for storing the data to be recorded on the optical disk 1 and releasing the data in the order of storage, and a comparator means 53 for comparing the ID number reproduced by a recording head 3 with the ID number stored in memory 52, wherein, in response to a signal indicating the coincidence of the ID numbers from comparator means 53, the data stored in memory 55 are supplied to a recording head 3 for recording the data on the optical disk 1. There are further provided a head selector 9 for selecting either reproduced signal 22a of the erasing beam or reproduced signal 42a of the reproducing beam, and a sector mark detection circuit 8 for generating a signal replacing the reproduced signal 22a of the erasing beam when the reproduced signal 42a of the reproducing beam is selected, whereby high-speed RAW check is enabled.

The present inventors have discovered that, in the recording unit and reproducing unit of a 2-beam optical record/reproducing apparatus capable of at least recording and reproducing on an optical disk 1, the reproduced data 32a of the recording beam and those 42a of the reproducing beam may be used in common by selective switching, and a signal process circuit may be used for both reproduced data.

Thus, in the present invention, the interface is provided with a circuit for combining the recording signal process circuit 63 and the reproducing signal process circuit 64 of the controller 6 of FIG. 6. For the RAW check, the controller 6 has conventionally required the reproduced data 32a of the recording beam and the reproduced data 42a of the reproducing beam, but, according to the present invention, the controller 6 requires only one such signal, since both data 32a, 42a are used by switching.

Consequently, in contrast to the conventional controller 6 requiring the recording signal process circuit 63 and the reproducing signal process circuit 64, the structure of the present invention only requires a signal process circuit obtained by adding a simple circuit to the recording signal process circuit 63.

Furthermore, in contrast to the switching of the reproduced data 32a of the recording beam and the reproduced data 42a of the reproducing beam conducted by the controller 6, the present invention enables processing without the controller 6, thus increasing the speed of the RAW check.

BRIEF DESCRIPTION OF THE DRAWINGS

FIGS. 2(a)–(i) constitute a wave form chart of principal signals in FIG. 1;

FIGS. 5(b) and 5(a1)–(k) constitute a wave form chart of principal signals in the signal processing circuit for the 3-beam optical record/reproducing apparatus of the present invention; and FIG. 6 is a block diagram showing signal processing in a conventional magnetooptical disk drive.

DESCRIPTION OF THE PREFERRED EMBODIMENTS

FIG. 1 shows an embodiment of signal processing of the present invention, and shows an ID number decoder 51, an ID number signal 51a; a memory 52; a comparator circuit 53; an output 53a of the comparator circuit; a FIFO register 55; a second ID number decoder 54; and a second ID number signal 54a.

In the following there will be explained the function of the present embodiment, with reference to FIG. 1. An old signal, already recorded on the disk 1 is read by the erasing head 2. The read signal 2a is binary digitized by the replay process circuit 22 of the erasing head 2, and is supplied, as reproduced data 22a of the erasing head, through the interface 5 to the erasing signal process circuit 62 in the controller 6. The circuit 62 sends a writing gate signal 20a, through the interface 5, to the position of the old signal where a new signal is to be recorded. Writing gate signal 20a is released as an erasing signal 21a by the laser drive unit 21 of the erasing head 2, which thus erases the old signal of the disk 1.

The reproduced data 22a of the erasing head is subjected to the reading of the ID number 51a of the sector by the ID number decoder 51, and the number is sent to the memory 52. The memory fetches the ID number 51a at the entry of the writing gate signal 20a, and simultaneously sends the fetched ID number 51a to the comparator circuit 53. The memory 52 has a capacity equal to the number of sectors corresponding to the time interval between the erasing beam 2 and the writing head 3.

Then a signal already written on the disk 1 (sector ID number etc.) is read by the writing head 3. The read signal 3a is binary digitized by the replay process circuit 32, and the obtained binary signal 32a is subjected to the reading of the second ID number 54a by the second ID number decoder 54. Second ID number 54a is supplied to the comparator circuit 53, and is compared with the ID number 52a supplied from the memory 52. If the ID number 52a coincides with the second ID number 54a, the output 53a of the comparator circuit is supplied to the laser drive unit 31 of the writing head 3 and the FIFO register 55.

In synchronization with the output 53a of the comparator circuit, the FIFO register 55 reads out the writing data 30a from an internal memory of the FIFO register 55. The writing data 55a from the FIFO register 55 and the output 53a of the comparator circuit are supplied to the laser drive unit 31 of the writing head 3 output of which is written, as a writing signal 31a, onto the disk 1 by the writing head 3.

FIGS. 2(a) to 2(i) show the timing of various signals shown in FIG. 1.

Figure 2:
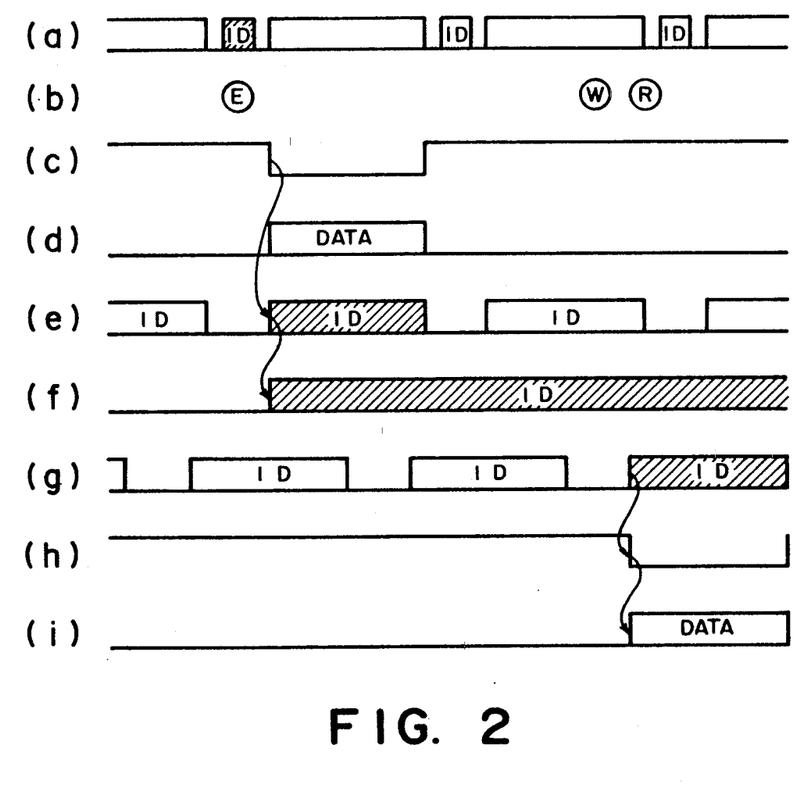

FIG. 2(a) is the wave form chart of the reproduced data 22a of the erasing head 2, namely the binary data read from the disk 1 by the erasing head 2. FIG. 2(b) shows the timing of the erasing head 2, writing head 3 and reading head 4 with respect to the reproduced data 22a of the erasing head 2, indicating that they pass in this order, when they are on the same track. Upon receiving the reproduced data 22a of the erasing head 2, the controller 6 locates the desired ID number 51a indicated by a hatched area, and sends the writing gate signal 20a shown in FIG. 2(c) and the writing data 30a shown in FIG. 2(d).

FIG. 2(e) indicates the ID number 51a decoded from the reproduced data 22a of the erasing head, wherein a hatched portion indicates the ID number. FIG. 2(f) indicates the desired ID number 52a, released to the comparator circuit 53 after fetching it in the memory 52 of the ID number 51a at the downshift edge shown in FIG. 2(c).

FIG. 2(g) indicates the second ID number 54a decoded from the reproduced data 32a read by the writing head 3, wherein a hatched portion indicates the second desired ID number. FIG. 2(h) indicates the signal 53a generated by the comparator circuit 53, upon coincidence of the ID number 52a and the second ID number 54a in the comparator circuit 53 (hatched portion). FIG. 2(i) shows the output 55a of the FIFO memory, released in synchronization with the output 53a of the comparator circuit.

The writing data 30a shown in FIG. 2(d) is written into the internal memory of the FIFO register 55, at the downshift edge of the writing gate signal 20a shown in FIG. 2(c), and the writing data 55a, delayed by the difference in positions of the erasing head 2 and the writing head 3, is read out from the internal memory, at the downshift edge of the output 53a (coincidence signal) of the comparator circuit.

Then the writing data 55a are written onto the disk 1 by the writing head 3, in synchronization with the output 53a of the comparator circuit.

The present invention, being capable of uniting the erasing and writing modes in the magnetooptical record/reproducing apparatus, allows dispenseing with the writing signal process circuit 63, of two signal process circuits 62, 63 (FIG. 6) in the controller 6, thereby simplifying the apparatus.

Also among 7 signal lines conventionally required between the interface 5 and the controller 6, the present invention allows dispensing with two signal lines, thereby reducing the number of lines to 5 and thereby simplifying the structure.

Furthermore, as the controller 6 becomes substantially similar to that for a magnetic rigid disk, there are also obtained additional advantages that the component parts for such magnetic rigid disk can be used for the controller of the present invention.

In the following there will be explained another embodiment of the present invention.

FIG. 3 illustrates another embodiment of the present invention, wherein equivalent components to those in FIG. 1 are represented by the same symbols. There are further shown a sector address mark detection circuit 8; a sector address mark detection signal 8a; a head selector 9; a head selection signal 9a; and signal 9b constituted by the reproduced data 32a of the recording beam or the reproduced data 42a of the reproducing beam, selected by the head selector 9.

The function of the present embodiment will be explained in the following, with reference to FIG. 3.

In a 2-beam optical record/reproducing apparatus in which a recording beam and a reproducing beam move relative to an optical disk 1 on the same track thereof, the signal for example of a sector address recorded on the optical disk 1 is at first reproduced by a recording optical unit 33 of a recording head 3. The obtained signal 33a is binary digitized by a replay process circuit 32 for recording to obtain reproduced data 32a of the recording beam. The head selector 9 of the interface 5 selects the reproduced data 32a of the recording beam as the reproduced data 9b, which are supplied to the recording signal process circuit 63 in the controller 6, thereby determining the position for recording.

For recording on the optical disk 1, the recording data 30a from the recording signal process circuit 63 in the controller 6 activate the recording laser drive unit 31 of the recording head 3 in synchronization with the recording gate signal 20a and are released as recording signal 31a, thus recorded on the optical disk 1 by the recording optical unit 33.

The signal now recorded on the optical disk 1 is reproduced by a reproducing optical unit 43 of the reproducing head 4 to provide a signal 43a, which is binary digitized by the replay process circuit 42 of the reproducing beam to obtain the, reproduced data 42a of the reproducing beam. The data 42a are selected by the head selector 9 of the interface 5, in response to the head selection signal 9a from the controller 6, and supplied, as the data 9b, to the recording signal process circuit 63 of the controller 6.

The RAW check is conducted by the comparison, in the controller 6, of the reproduced data 32a of the recording beam and the reproduced data 42a of the reproducing beam.

More detailedly, the binary reproduced data 32a of the recording beam, read by the recording head 3, are sent to the sector address mark detection circuit 8 and the head selector 9. The detection circuit 8 detects the position of the sector and the address mark in the binary reproduced data 32a of the recording beam, and sends a sector address detection signal 8a, indicating the timing or position thereof, to the controller 6. On the other hand, the head selector 9 receives, simultaneously with the reproduced data 32a of the recording beam, the binary reproduced data 42a of the reproducing beam, read by the reproducing head 4. Except for the normal reproduction or the RAW check, the head selector 9, in response to the head selection signal 9a from the controller 6, selects the reproduced data 32a of the recording beam, as the reproduced data 9b for supply to the controller 6.

The details of the RAW check operation are as follows.

Upon confirmation of the sector position and the ID number from the reproduced data 32a of the recording beam, the controller 6 sends the recording gate signal 20a and the recording data 30a, thereby effecting the recording operation.

Then the controller 6 sends the head selection signal 9a to switch the reproduced data 9a from the reproduced data 32a of the recording beam to the reproduced data 42a of the reproducing beam. When the output of the head selector 9 is switched as explained above, the timing of the recording gate signal 20a and the recording data 30a is determined by the controller 6, based on the sector address mark detection signal 8a from the sector address mark detection circuit 8.

In the RAW check, the controller 6 confirms the sector number for first writing from the reproduced data 32a of the recording beam, then sends the recording data 30a and the recording gate signal 20a to that sector, and releases the head selection signal 9a, whereby the reproduced data 32a of the recording beam are switched to the reproduced data 42a of the reproducing beam, and the data written into the optical disk 1 can be read.

Also in case of recording data in a next sector indicated by the reproduced data 32a of the recording beam, the controller 6 determines the timing by the sector address mark detection signal 8a from the interface 5, and sends the recording gate signal 20a and the recording data 30a to the interface 5 at that timing. The recording laser drive unit 31 executes the data recording in the target sector with the recording beam, in synchronization with the recording gate signal 20a. Thus the controller 6 executes the RAW check, by reading the data recorded on the optical disk 1, as the reproduced data 42a of the reproducing beam.

In the foregoing there has been explained a case of using a disk-shaped medium, but the functions are similar also in case of a card-shaped medium.

FIG. 4 shows still another embodiment of the present invention, wherein equivalent components to those in FIG. 1 are represented by the same symbols. There are shown an erasing head 2; reproduced data 22a of the erasing beam; an ID number decoder 51; an ID number signal 51a; a memory 52, a memory output 52a; a comparator circuit 53; an output 53a of the comparator circuit; a second ID number decoder 54; a second ID number signal 54a; a FIFO memory 55; and an output 55a of the FIFO memory.

The function of the present embodiment will be explained in the following with reference to FIG. 4.

In a signal processing circuit of a 3-beam optical record/reproducing apparatus in which an erasing head 2, a recording head 3 and a reproducing head 4 are so arranged, in their motion relative to an optical disk 1 on the same track thereof, that a point on optical disk 1 is at first passed by the erasing head 2, then by the recording head 3 and at last by the reproducing head 4, an old signal already recorded on the optical disk 1 is reproduced by the erasing head 2. The reproduced data 22a of the erasing beam are selected by the head selector 9 of the interface 5, in response to the head selection signal 9a from the controller 6, and supplied as the reproduced data 9b to the signal process circuit 62 in the controller 6, whereby the location for recording is determined.

Then, for recording on the optical disk 1, the signal process circuit 62 of the controller 6 sends the recording gate signal 20a through the interface 5, to the location for recording, namely the location of the old signal. The recording gate signal 20a is released, as the erasing signal 21a, by the laser drive unit 21 of the erasing head 2, whereby the old signal of the optical disk 1 is erased by the erasing optical unit 23.

The ID number 51a of the sector is read from the reproduced data 22a of the erasing beam by the ID number decoder 51, and is sent to the memory 52. The memory 52 fetches the ID number 51a in response to the entry of the recording gate signal 20a, and sends it to the comparator circuit 53. The memory 52 has a capacity at least equal to the number of sectors corresponding to the time interval between the erasing head 2 and the recording head 3.

Then the signal already recorded on the optical disk 1 is read by the recording head 3. The signal 33a read by the recording optical unit 33 of the recording head 3 is binary digitized by the replay process circuit 32, and the obtained binary signal 32a is subjected to the reading of the second ID number 54a by the second ID number decoder 54. The second ID number 54a is supplied to the comparator circuit 53, and is compared with the ID number 51a supplied as the output 52a of the memory. When the ID number 51a and the second ID number 54a mutually coincide, the output signal 53a of the comparator circuit is supplied to the laser drive unit 31 of the recording head 3, and also to the FIFO memory 55.

The FIFO memory 55 reads out, from the internal memory thereof, the recording data 30a supplied from the signal process circuit 62, as the recording data 55a in synchronization with the output 53a of the comparator circuit. The recording data 55a from the FIFO memory 55 and the output 53a of the comparator circuit are supplied to the laser drive unit 31 of the recording head 3, output of which is recorded as the recording signal 31a onto the optical disk 1 by the recording optical unit 33.

Then the reproducing gate signal 40a is supplied from the signal process circuit 62 of the controller 6 to the reproducing laser drive unit 41, output signal 41a of which activates the reproducing optical unit 43 for replaying operation. The signal 43a thus read from the optical disk 1 is binary digitized by the replay process circuit 42 of the reproducing beam to obtain the reproduced data 42a of the reproducing beam. Those data are selected, as the reproduced data 9b, by the head selector 9 of the interface 5 in response to the head selection signal 9a from the controller 6, and are supplied to the signal process circuit 62 of the controller 6. The controller 6 effects the RAW check by comparison with the aforementioned reproduced data 22a of the erasing beam.

The binary reproduced data 22a, obtained by the erasing head 2, are sent to the sector address mark detection circuit 8 and the head selector 9. The sector address mark detection circuit 8 detects the sector and the address mark position from the binary reproduced data 22a of the erasing beam, and sends the sector address mark detection signal 8a, constituting a timing signal, to the controller 6.

On the other hand, the head selector 9 also receives the binary reproduced data 42a of the reproducing beam, simultaneously with the reproduced data 22a of the erasing beam. Except for the ordinary reproduction or the RAW check, the head selector 9 selects the reproduced data 22a of the erasing beam as the reproduced data 9b for supply to the controller 6, in response to the head selection signal 9a from the controller 6.

In the following there will be explained the details of the RAW check.

Upon confirmation of the sector position and the ID number from the reproduced data 22a of the erasing beam, the controller 6 sends the recording gate signal 20a and the recording data 30a, thereby effecting the recording.

Then the controller 6 releases the head selection signal 9a, whereby the reproduced data 9b are switched from the data 22a of the erasing beam to the data 42a of the reproducing beam. After the switching of the output of the head selector 9 as explained above, the controller 6 determines the timing of sending the recording gate signal 20a and the recording data 30a, based on the sector address mark detection signal 8a from the sector address mark detection circuit 8.

Figure 5:
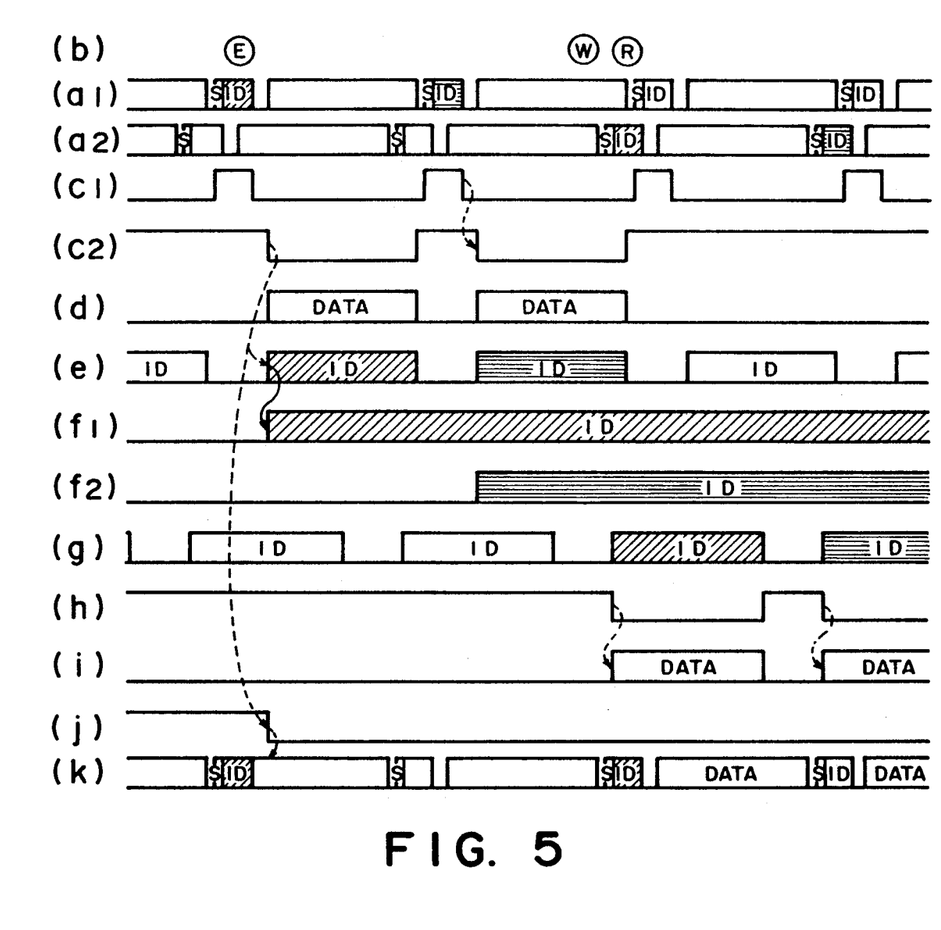

FIG. 5 shows the timing of signals in the circuit shown in FIG. 4.

In FIG. 5, (a1) and (a2) respectively show the reproduced data 22a of the erasing beam and those 42a of the reproducing beam, namely binary data read from the optical disk 1 respectively by the erasing head 2 and the reproducing head 4. FIG. 5(b) shows the timing of the erasing beam, recording beam and reproducing beam with respect to the reproduced data 22a of the erasing beam, indicating that the beams proceed in this order when they are on the same track.

FIG. 5(c1) is the sector address mark detection signal 8a detected in the reproduced data 22a of the erasing beam, FIG. 5(c2) is the recording gate signal 20a, and FIG. 5(d) is the recording data 30a.

FIG. 5(e) shows the ID number 51a decoded from the reproduced data 22a of the erasing beam, in which the hatched area indicates the target ID number.

FIGS. 5(f1) and 5(f2) show the target ID number 52a (hatched portion) obtained by fetching of the ID number 51a (hatched portion) in the memory 52 at the downshift edge in FIG. 5(c2) and releasing to the comparator circuit 53.

FIG. 5(g) shows the second ID number 54a decoded from the reproduced data 32a read by the recording beam, in which the hatched portion indicates the target second ID number.

FIG. 5(h) indicates the output 53a of the comparator circuit 53 in case of coincidence of the ID numbers (hatched areas) in the comparison of the ID number 52a from the memory 52 and the second ID number 54a.

FIG. 5(i) shows the output 55a of the FIFO memory, released in synchronization with the output 53a of the comparator circuit.

FIG. 5(j) shows the head selection signal 9a, which selects the reproduced data 22a of the erasing beam or those 42a of the reproducing beam, as the data 9b.

FIG. 5(k) shows the reproduced data 42a of the reproducing beam, selected as the data 9b.

In case of RAW check, the controller 6 confirms the sector number for first writing from the represented data 22a of the erasing beam (hatched area in FIG. 5(a1)), and sends the recording data 30a and the recording gate signal 20a to that sector. Then the controller 6 releases the head selection signal 9a, for switching the reproduced data 22a of the erasing beam to those 42a of the reproducing beam for the RAW check. Thus, the data recorded on the disk can be read with a delay corresponding to the distance in beam positions shown in FIG. 5(b).

In case of data recording in the next sector (horizontal-lined) indicated by the reproduced data 22a of the erasing beam (FIG. 5(a1)), the timing of recording is determined by the sector address mark detection signal 8a from the interface 5, and the recording gate signal 20a and the recording data 30a are sent to the interface 5 at that timing. The erasing laser drive unit 21 causes, in synchronization with the recording gate signal 20a, the erasing head 2 to erase the data in the target sector (horizontal lined in FIG. 5(a1)).

Also at the downshift edge of the recording gate signal 20a, the ID number 51a of the recording beam is fetched in the memory 52, and the output signal 52a thereof is compared with the second ID number 54a of the recording beam, thereby obtaining the output signal 53a from the comparator circuit in case of coincidence. The recording data 30a stored in the internal memory of the FIFO memory 55 are read in synchronization with the downshift edge of the output 53a of the comparator circuit. Thus the controller 6 executes the RAW check by reading the data recorded on the optical disk, as the reproduced data 42a of the reproducing beam.

As explained in the foregoing, in an optical disk drive in which the optical disk 1 can be independently irradiated by the recording head and the reproducing head, the RAW check can be executed without waiting time for rotation, whereby the RAW check can be conducted faster and the transfer rate at recording can be increased.

Also in contrast to the conventional RAW check requiring the recording signal process circuit 63 and the reproducing signal process circuit 64 in the controller 6, the present invention requires only one signal process circuit by the addition of a simple circuit to the interface 5, thereby simplifying the apparatus.

Also in case of the RAW check in an optical disk drive capable of independently irradiating the optical disk 1 with the erasing head, recording head and reproducing head, there have conventionally required erasing signal process circuit 62, recording signal process circuit 63 and reproducing signal process circuit 64 in the controller 6, but the present invention only requires one signal process circuit by the addition of a simple circuit to the interface 5, thereby significantly simplifying the apparatus.

What is claimed is:

1. Optical recording/reproducing apparatus having an optical recording medium that is moved relative to an erasing head and to a recording head which are positioned so that a point on said medium passes said erasing head before passing said recording head, said erasing head being capable of reproducing signals recorded on said medium as well as erasing signals recorded on said medium, and said recording head being capable of reproducing signals recorded on said medium as well as recording signals on said medium, said apparatus comprising:

means including a first memory for storing an identification component of a signal reproduced by said erasing head in order to designate a portion on said medium at which erasure starts;

means including a second memory for storing data to be recorded on said medium by said recording head;

comparator means for comparing an identification component of a signal reproduced by said recording head with an identification component stored in said first memory and for producing an output signal when the compared identification components are the same; and means responsive to said output signal for supplying the data stored in said second memory to said recording head for recording.

2. Optical recording/reproducing apparatus having an optical recording medium movable relative to a recording head and to a reproducing head, said recording head being capable of reproducing signals recorded on said medium as well as recording signals on said medium, said apparatus comprising:

signal processing means;

switching means for selectively supplying to said signal processing means a signal reproduced by said recording head or a signal reproduced by said reproducing head, said switching means being controlled by said signal processing means; and signal generating means for supplying to said signal processing means a signal corresponding to a signal reproduced by said recording head when said switching means supplies to said signal processing means a signal reproduced by said reproducing head, wherein said switching means is controlled by said signal processing means to supply to said signal processing means a signal reproduced by said reproducing head and said signal processing means determines whether a recorded signal is correct.

3. Optical recording/reproducing apparatus according to claim 2, wherein said signal generating means detects an address mark in a signal reproduced by said recording head and supplies to said signal processing means a signal corresponding to said address mark.

4. Optical recording/reproducing apparatus according to claim 2, wherein said signal processing means supplies data to be recorded to said recording head and then controls said switching means to supply to said signal processing means a signal reproduced by said reproducing head.

5. Optical recording/reproducing apparatus having an optical recording medium movable relative to an erasing head, to a recording head, and to a reproducing, said heads being positioned so that a point on said medium passes said erasing head, then passes said recording head, and then passes said reproducing head, said erasing head being capable of reproducing signals recorded on said recording medium as well as erasing signals recorded on said medium, and said recording head being capable of reproducing signals recorded on said medium as well as recording signals on said medium, said apparatus comprising;

signal processing means;

switching means for selectively supplying to said signal processing means a signal reproduced by said erasing head or a signal reproduced by said reproducing head, said switching means being controlled by said signal processing means;

means including a first memory for storing an identification component of a signal reproduced by said erasing head in order to designate a point on said medium at which erasure starts;

comparator means for comparing an identification component of a signal reproduced by said recording head with an identification component stored in said first memory and for producing an output signal when the compared identification components are the same;

means including a second memory for storing data to be recorded on said recording medium by said recording head and for supplying the stored data to said recording head in response to said output signal; and signal generating means for supplying to said signal processing means a signal corresponding to that reproduced by said erasing head when said switching means supplies to said signal processing means a signal reproduced by said reproducing head, wherein said switching means is controlled by said signal processing means to supply to said signal processing means a signal reproduced by said reproducing head and said signal processing means determines whether a recorded signal is correct.

6. Optical recording/reproducing apparatus according to claim 5, wherein said signal generating means detects an address mark in a signal reproduced by said erasing head and supplies to said signal processing means a signal corresponding to said address mark.

7. Optical recording/reproducing apparatus according to claim 5, wherein said signal processing means supplies said data to be recorded to said second memory and thereafter controls the switching of said switching means as as to supply to said signal processing means a signal reproduced by said reproducing head.

* * * * *